United States Patent
Park et al.

(10) Patent No.: US 11,307,414 B2
(45) Date of Patent: Apr. 19, 2022

(54) NEAR-EYE DISPLAY SYSTEM

(71) Applicant: Intel Corporation, Santa Clara, CA (US)

(72) Inventors: Hongbae Sam Park, Burnaby (CA); Reynald Antoine Hoskinson, Vancouver (CA); Hamid Abdollahi, Vancouver (CA); Boris Stoeber, Vancouver (CA)

(73) Assignee: Intel Corporation, Santa Clara, CA (US)

( * ) Notice: Subject to any disclaimer, the term of this patent is extended or adjusted under 35 U.S.C. 154(b) by 419 days.

(21) Appl. No.: 16/363,275

(22) Filed: Mar. 25, 2019

(65) Prior Publication Data

US 2019/0219827 A1 Jul. 18, 2019

Related U.S. Application Data

(63) Continuation of application No. 15/510,283, filed as application No. PCT/US2015/056296 on Oct. 20, 2015, now Pat. No. 10,241,334.

(Continued)

(51) Int. Cl.
*G02B 27/01* (2006.01)
*B60K 37/00* (2006.01)
*G02B 3/00* (2006.01)

(52) U.S. Cl.
CPC .......... *G02B 27/0172* (2013.01); *B60K 37/00* (2013.01); *G02B 3/0006* (2013.01);

(Continued)

(58) Field of Classification Search
CPC ............ G02B 17/0892; G02B 17/0808; G02B 17/08; G02B 17/0856; G02B 21/04;
(Continued)

(56) References Cited

U.S. PATENT DOCUMENTS 8,508,830 B1 8/2013 Wang
8,773,573 B1 7/2014 Saeedi et al.
(Continued)

FOREIGN PATENT DOCUMENTS

KR 1020020034875 A 5/2002

OTHER PUBLICATIONS

International Search Report and Written Opinion in International Application No. PCT/US2015/056296, dated Feb. 2, 2016, 10 pages.

(Continued)

*Primary Examiner* — William R Alexander
*Assistant Examiner* — Sharrief I Broome
(74) *Attorney, Agent, or Firm* — Patent Capital Group

(57) ABSTRACT

The present disclosure provides a near-eye display system for generating a virtual image of a display, including: a display, a first lens array comprising a plurality of concave microlenses having a first pitch, and a second lens array positioned in front of the first lens array, the second lens array comprising a plurality of convex microlenses having a second pitch, wherein the first lens array is positioned on an optical path between the display and the second lens array, and wherein the first lens array has a focal plane at the display and the second lens array has a focal plane at a virtual image plane of the first lens array.

28 Claims, 12 Drawing Sheets

Related U.S. Application Data

(60) Provisional application No. 62/066,256, filed on Oct. 20, 2014.

(52) U.S. Cl.
CPC ......... *G02B 27/01* (2013.01); *G02B 27/0101* (2013.01); *G02B 2027/0127* (2013.01)

(58) Field of Classification Search
CPC ............ G02B 17/0812; G02B 17/0657; G02B 23/06; G02B 17/0663; G02B 17/0852; G02B 17/0615; G02B 17/061; G02B 17/0804; G02B 17/0652; G02B 17/0896; G02B 13/22; G02B 17/0844; G02B 17/086; G02B 21/02; G02B 21/16; G03F 7/70225; G03F 7/70233; G03F 7/70275; G03F 7/70341; G03F 7/702; G03F 1/84; G03F 7/70191; G03F 7/70616; G03F 7/7065; G03F 7/70058; G03F 7/70075; G03F 7/70083; G03F 7/70166; G03F 7/70175; G03F 7/70358; G03F 7/70033; G03F 7/7005; G03F 7/70066; G03F 7/70091; G03F 7/70108; G01J 3/02; G01J 3/0208; G01J 3/024; G01J 3/2823; G01J 2003/1204; G01J 2003/1208; G01J 2003/1213; G01J 2003/1226; G01J 3/021; G01J 3/10; G01J 3/12; G01J 3/14; G01J 3/18; G01J 3/189; G01J 3/2803; G01J 3/32; G01J 3/4406; G01N 2021/6432; G01N 2021/6478; G01N 21/0332; G01N 21/253; G01N 21/6428; G01N 21/6452; G01N 21/6456; G01N 21/76; G01N 2021/0325; G01N 2021/6417; G01N 2021/6463; G01N 21/276; G01N 21/31; G01N 21/6408; G01N 21/6445; G01N 21/6458; G01N 21/763; G01N 21/8806; G01N 21/9501; G03H 1/0808; G03H 1/0841; G03H 1/2205; G03H 1/2249; G03H 1/2286; G03H 1/2294; G03H 1/2645; G03H 2001/0816; G03H 2001/085; G03H 2001/2215; G03H 2001/2218; G03H 2001/2231; G03H 2001/2255; G03H 2001/2271; G03H 2001/2297; G03H 2001/261; G03H 2001/306; G03H 2210/20; G03H 2210/30; G03H 2210/40
See application file for complete search history.

(56) References Cited

U.S. PATENT DOCUMENTS

| | | | |
|---|---|---|---|
| 2002/0047837 A1* | 4/2002 | Suyama | H04N 13/344 345/204 |
| 2002/0085287 A1 | 7/2002 | Egawa | |
| 2010/0328420 A1 | 12/2010 | Roman | |
| 2012/0212399 A1* | 8/2012 | Border | G06F 3/005 345/8 |
| 2012/0249537 A1* | 10/2012 | Bae | G02B 30/27 345/419 |
| 2012/0265018 A1 | 10/2012 | Rehe | |
| 2013/0021226 A1* | 1/2013 | Bell | G02B 27/017 345/8 |
| 2014/0028933 A1* | 1/2014 | Chen | H04N 13/305 349/15 |
| 2014/0071026 A1 | 3/2014 | Hatashita et al. | |
| 2014/0118829 A1 | 5/2014 | Ma et al. | |
| 2014/0168034 A1 | 6/2014 | Luebke et al. | |
| 2014/0168783 A1 | 6/2014 | Luebke et al. | |
| 2015/0253469 A1* | 9/2015 | Le Gros | G02B 3/0006 359/619 |
| 2015/0286062 A1 | 10/2015 | Zheng et al. | |
| 2016/0085084 A1 | 3/2016 | Masson et al. | |
| 2017/0269358 A9 | 9/2017 | Luebke et al. | |
| 2017/0293148 A1 | 10/2017 | Park et al. | |

OTHER PUBLICATIONS

Non-Final Office Action issued in U.S. Appl. No. 15/510,283 dated Apr. 19, 2018, 16 pages.

Notice of Allowance in U.S. Appl. No. 15/510,283 dated Nov. 15, 2018, 7 pages.

\* cited by examiner

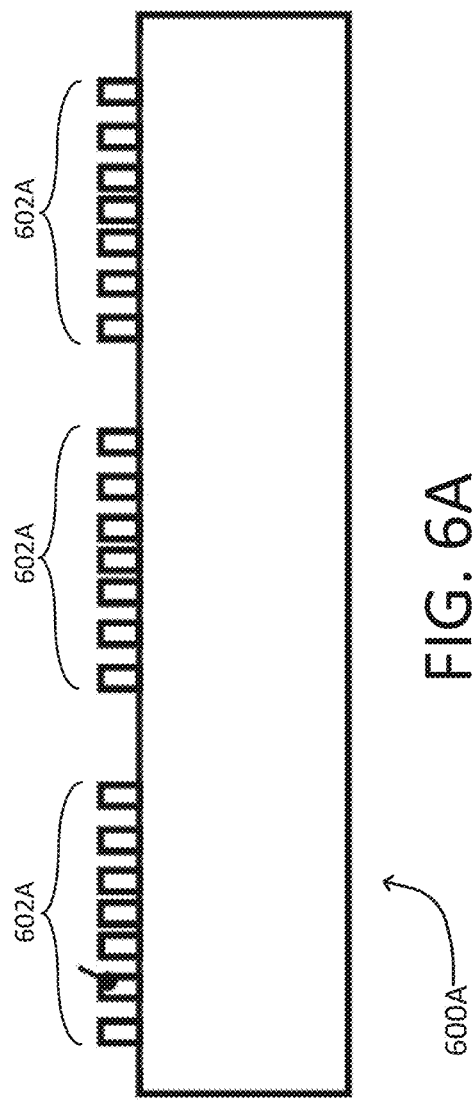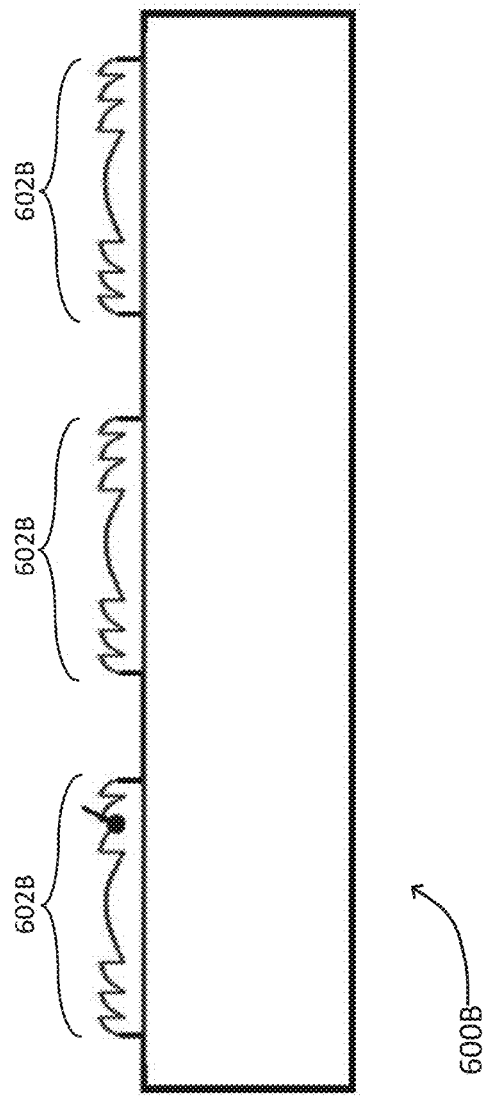

NEAR-EYE DISPLAY SYSTEM

CROSS REFERENCE TO RELATED APPLICATIONS

This Application is a continuation (and claims the benefit of priority under 35 U.S.C. § 120) of U.S. patent application Ser. No. 15/510,283, now U.S. Pat. No. 10,241,334 filed on Mar. 10, 2017, and entitled NEAR-EYE DISPLAY SYSTEM which is a National Stage application under 35 U.S.C. 371 of International Application PCT/US2015/056296, filed on Oct. 20, 2015, and entitled NEAR-EYE DISPLAY SYSTEM, which claims the benefit of priority to U.S. Provisional Patent Application No. 62/066,256 titled "NEAR-EYE DISPLAY SYSTEM" and filed on Oct. 20, 2014, the entire contents of which are incorporated by reference herein, in their entirety.

TECHNICAL FIELD

The present disclosure relates to a near-eye display system, which may, for example, be encompassed in a heads-up display system.

BACKGROUND

Head-Up Display (HUD) systems have become popular in a number of applications, including personal wearable devices. Generally, HUD systems present data to a user without requiring the user to look away from their usual viewpoints.

A near-eye display system creates a display in front of the user's field of vision and is an integral part of any HUD system. One of the limiting factors in designing a near-eye system for HUD systems is the human eye's accommodation. Accommodation is the process by which the human eye changes optical power to maintain a clear image or focus on an object as its distance varies. A normal human eye can typically comfortably focus on objects at a distance of 25 cm or greater, although studies have indicated that the minimum distance a normal human eye can focus (minimum amplitude of accommodation) can be as small as about 10 Dioptre, which is roughly around 10 cm.

Wearable HUD systems are generally intended for ease of portability and comfort of use. Compact systems that provide for the minimum amplitude of accommodation of a user's eye, are desirable.

Improvements in near-eye displays are desirable.

BRIEF DESCRIPTION OF THE DRAWINGS

These and other features of the disclosure will become more apparent from the following description in which reference is made to the appended drawings wherein:

FIG. 6A is a schematic diagram of a diffractive grating layer.

FIG. 6B is a schematic diagram of a Fresnel grooves layer.

DETAILED DESCRIPTION

Figure 1:
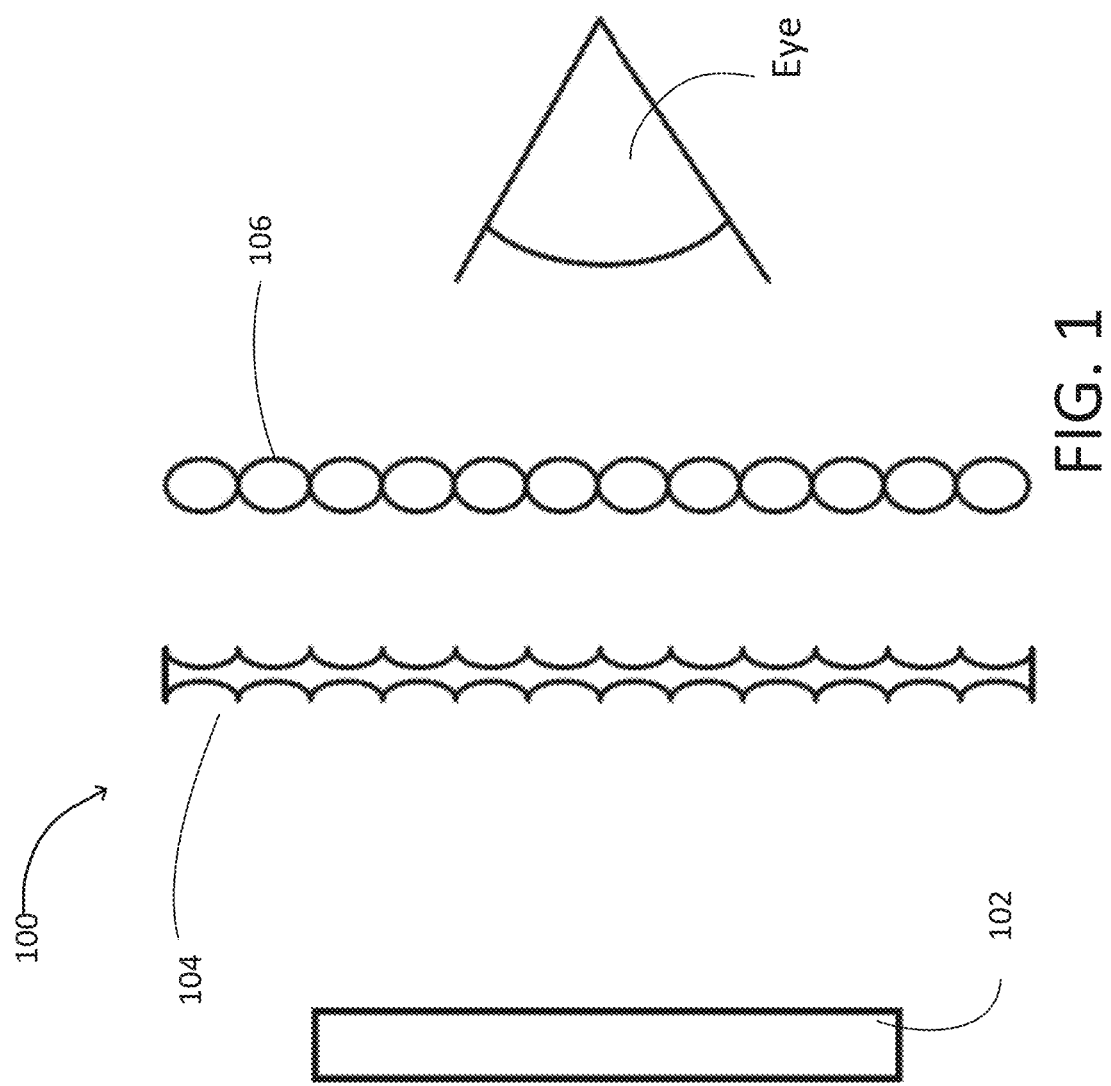
FIG. 1 is a schematic diagram of an example of a near-eye display (NED) system.

Generally, the present disclosure provides a near-eye display (NED) system for generating a virtual image of a display, including: a display, a first lens array positioned in front of the display, the first lens array comprising a plurality of concave microlenses having a first pitch, and a second lens array positioned in front of the first lens array, the second lens array comprising a plurality of convex microlenses having a second pitch, wherein the first lens array has a focal plane at the display and the second lens array has a focal plane at a virtual image plane of the first array.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

A schematic illustration of an example near-eye display (NED) system 100 is shown in FIG. 1. The near-eye display system 100 includes a display 102 that transmits visual information for visual reception, and a first lens array 104 and a second lens array 106 that transmit and refract light provided by the display 102. FIG. 1 shows a convex first microlens array 104 and a concave second lens array 106.

In the context of the present disclosure, it should be understood that each of a lens' optical surfaces may be convex (bulging outwards from the lens), concave (depressed into the lens), or planar (flat). A lens is biconvex if both of its optical surfaces are convex, whereas a lens is biconcave if both of its optical surfaces are concave.

In the context of the present disclosure, a near-eye display system is a system with one or more optical elements within the user's field of vision that present an image for viewing by the user. The optical elements may be transparent or opaque depending on the application. For example, as discussed further below in some embodiments, the display itself may be within the user's field of vision, whereas in other embodiments the display may be outside of the user's field of vision, and a beamsplitter, holographic optical element, or other optical element may be used to direct light from the display to the user's eye.

In the context of the present disclosure, the display 102 may be any display that presents visual information by emitting light. An example of a display that may be used in the present disclosure is a liquid crystal display (LCD).

In the context of the present disclosure, a lens array contains multiple small lenses, which may be referred to as microlenses. The microlenses of a lens array may be arranged in a one-dimensional or two-dimensional matrix. The examples disclosed herein contemplate lens arrays comprising two-dimensional matrices of microlenses, which would typically be used in conjunction with typical displays such as, for example, LCDs. Lens arrays comprising one-dimensional matrices of microlenses may be useful in conjunction with retinal-scanning type near-eye displays.

In some embodiments, the microlenses of each lens array are all evenly spaced. The term "pitch" is used to refer to the center-to-center spacing between adjacent microlenses of an array.

The microlenses of an array may be formed from a block of transparent optical material, or may be formed from transparent optical material on a supporting substrate. A supporting substrate may be a thin sheet of light-permitting substrate. The optical material used for the microlenses and/or the supporting substrate may, for example, be quartz glass, borosilicate glass (e.g. Pyrex™), or polymer-based materials such as polydimethylsiloxane (PDMS) or poly (methyl methacrylate) (PMMA). In some embodiments, a lens array may be made by preparing a mold and using the mold for example to stamp out the array from a suitable optical material, or filling the mold with suitable optical material.

In some embodiments, all microlenses in an array have the same focal length. Accordingly, each lens array may consist of either convex or concave microlenses.

In the context of the present disclosure, it should be understood that two or more lens arrays, with different pitches, in series, collectively form a superlens. The pitch of a lens array is defined as the distance between the centers of adjacent microlenses in the lens array.

Figure 2A:
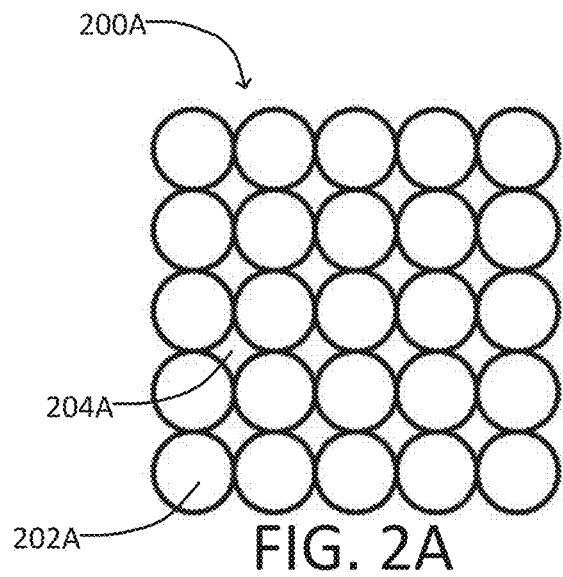
FIGS. 2A-H are a schematic diagrams of different arrangements and shapes of microlenses in a lens array.
Figure 2B:
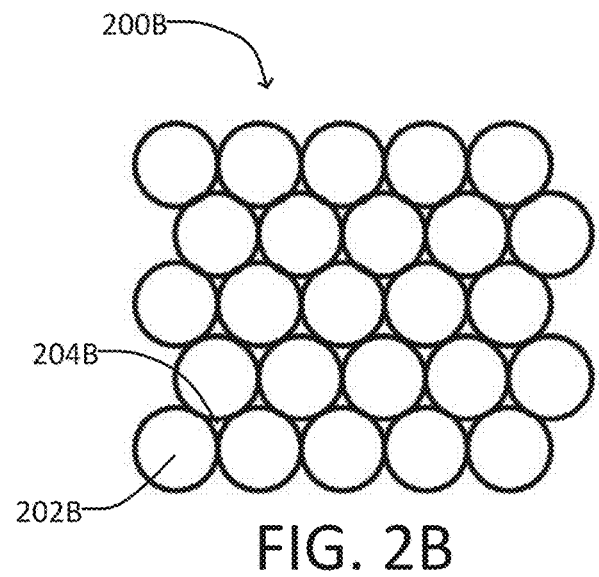
Figure 2C:
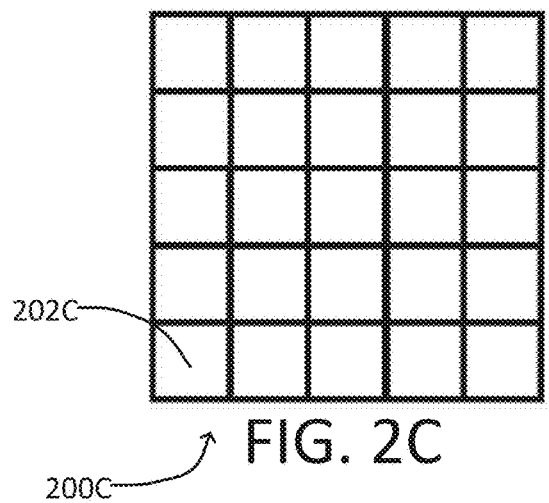
Figure 2D:
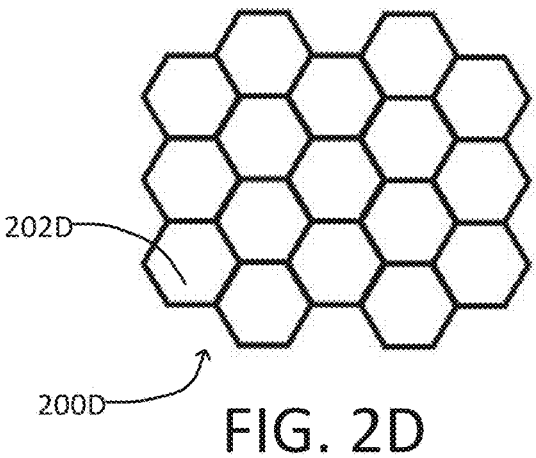

Microlenses of different shapes and arrangements in a microlens may be used, as desired. For example, FIG. 2A shows an example array 200A with circular lenses 202A arranged in an orthogonal formation, and FIG. 2B shows an example array 200B with circular lenses 202A arranged in a hexagonal formation. In both of the arrays 200A/200B, there is some "non-lens area" 204A/204B (formed by the gaps between microlenses), such that the "fill-factor" of the microlenses is less than 100%. The hexagonal formation of circular lenses in array 200B has a higher fill-factor than the orthogonal formation circular lenses in array 200A. FIGS. 2C and 2D show example arrays 200C and 200D that provide 100% fill-factor, but the square microlenses 202C of array 200C of FIG. 2C, and the hexagonal microlenses 202C of array 200D of FIG. 2D may be more difficult to fabricate than circular lenses.

Lens arrays with 100% fill factor provide increased light propagation efficiency in comparison to arrays with less than 100% fill factor. For example, where light from the display passes through gaps between the microlenses, this light is not refracted and instead reaches the user's eye as stray light, which may be perceived as a blur, and result in decreased resolution. In some embodiments, the non-lens area of a lens array may be covered with a light-blocking paint or other opaque material such that light is only permitted to pass through the lens portions of the lens array. In some embodiments, the non-lens areas of both of the first and second lens arrays 104/106 comprise opaque material. In some embodiments, the non-lens area of only one of the first and second lens arrays 104/106 comprises opaque material. For example, in some embodiments an opaque coating may be applied to the second (convex) lens array 106, which is the outermost array. In other embodiments, an opaque coating may be applied to the first (concave) lens array 104, which may simplify fabrication since the first lens array 104 has a flatter profile (e.g., the concave microlenses of the first lens array 104 may not protrude outwardly from the surface(s) of the array).

Figure 2E:
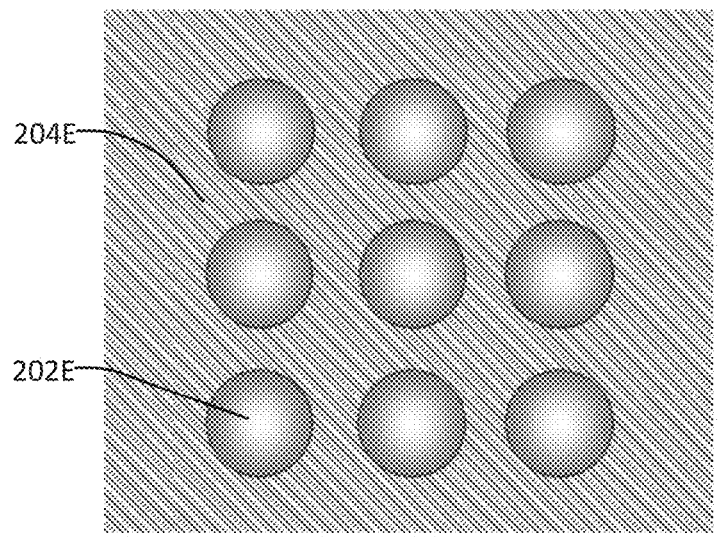

FIG. 2E shows an example lens array 200E with circular microlenses 202E arranged in an orthogonal formation, and separated from one another such that the edges of the microlenses do not abut each other, resulting in a greater percentage of non-lens area 204E (and thus a lower fill-factor) in comparison to array 200A of FIG. 2A. The non-lens area 204E of array 200E is covered with a light-blocking material such that light can only pass through the array 200E through the microlenses 202E.

Arrays such as the example array 200E of FIG. 2E with relatively greater amounts of non-lens area that is rendered opaque may be useful in situations where strong ambient light is present. For example, sunlight management is an important consideration in the design of NEDs, because oftentimes sunlight can enter into the NED through the lens (e.g., by reflection from the user's cheek), if the intensity of the sunlight overpowers the brightness of the display, it can wash out the display. By providing a lens array with a reduced fill factor and an opaque non-lens area, the light-blocking coating on the non-lens area can advantageously reduce the amount of sunlight entering the NED through the array.

Figure 2F:
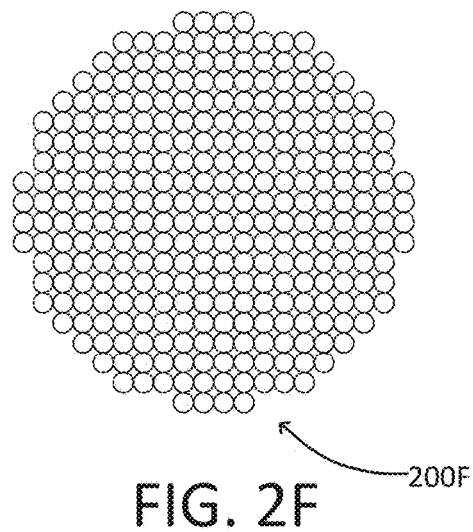
Figure 2G:
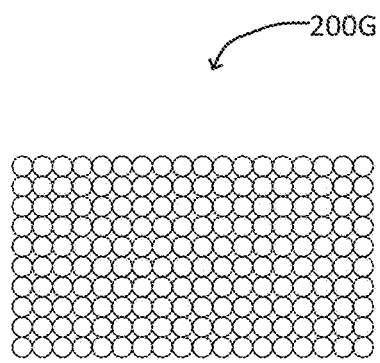
Figure 2H:
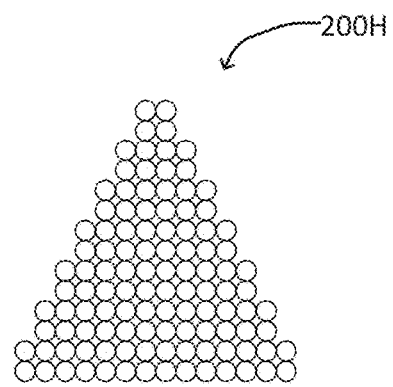

The example arrays of FIGS. 2A-E have generally square shapes, but it is to be understood that the shape of a lens array can be varied depending on the intended application. For example, lens arrays can have shapes that are generally circular (e.g. array 200F of FIG. 2F), rectangular (e.g. array 200G of FIG. 2G), triangular (e.g. array 200H of FIG. 2H), hexagonal (now shown), or other shapes.

Figure 3:
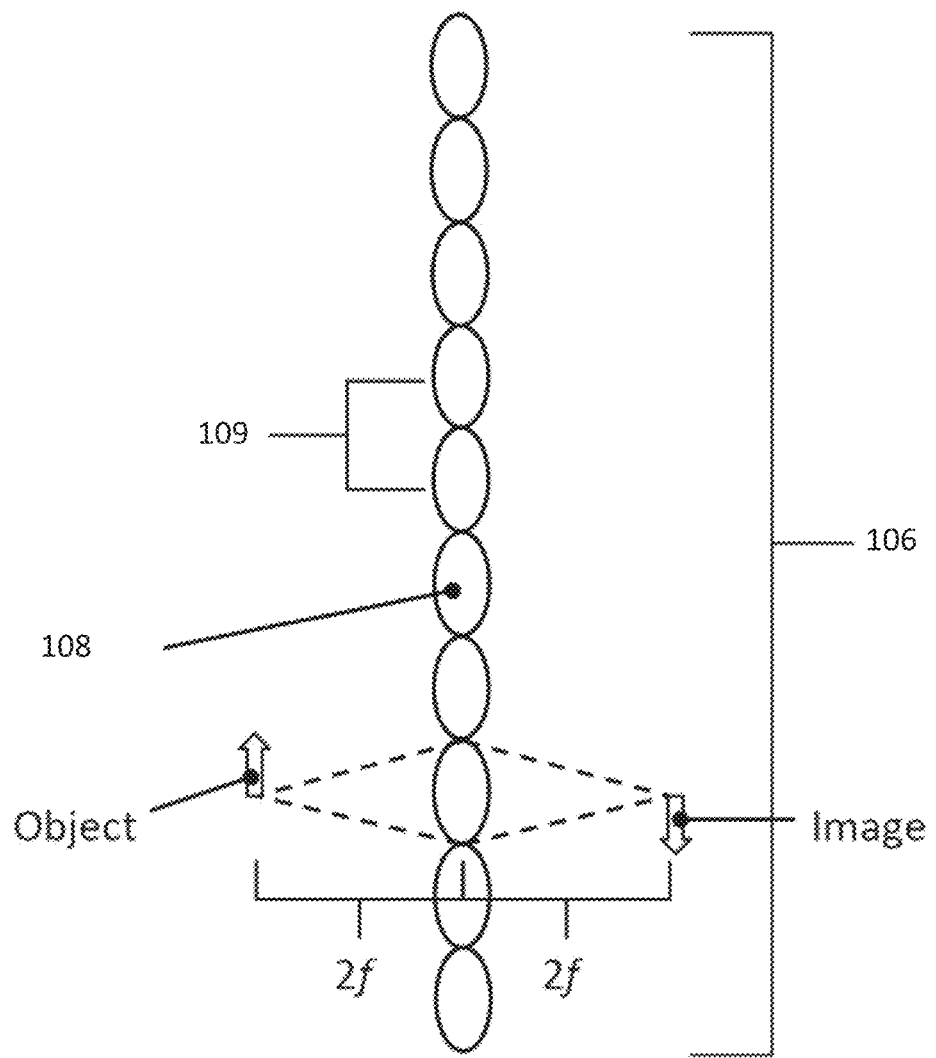
FIG. 3 is a schematic diagram of an example of a lens array.

FIG. 3 is a schematic diagram of an example of a convex (second) lens array 106 consisting of convex microlenses 108 having a pitch p 109. (The first lens array is not shown in FIG. 3.) In the context of the present disclosure, it should be understood that the relationship between the pitches and focal lengths of the first and the second lens arrays 104 and 106, and the behavior of the light rays passing through the system 100, is defined by Equation 1:

$$F = \frac{p1}{p1 - p2} f2, \qquad \text{Equation 1}$$

wherein F is the focal length of the system 100 as a whole, p1 is the pitch of the first lens array 104, and p2 and f2 are the pitch and effective focal length, respectively, of the second lens array 106.

In the context of the present disclosure, it should be understood that focal length is the measure of how strongly an optical system converges or diverges light. For an optical system in air, it is the distance over which initially collimated rays are brought to a focus. The focal plane is the plane through a focal point and perpendicular to the optical axis of a lens. A virtual image is an image formed when the outgoing rays from a point on an object diverge and the image appears to be located at the point of apparent divergence. In contrast, a real image is one that is formed when the outgoing rays from a point on an object converge at a real location.

Figure 4:
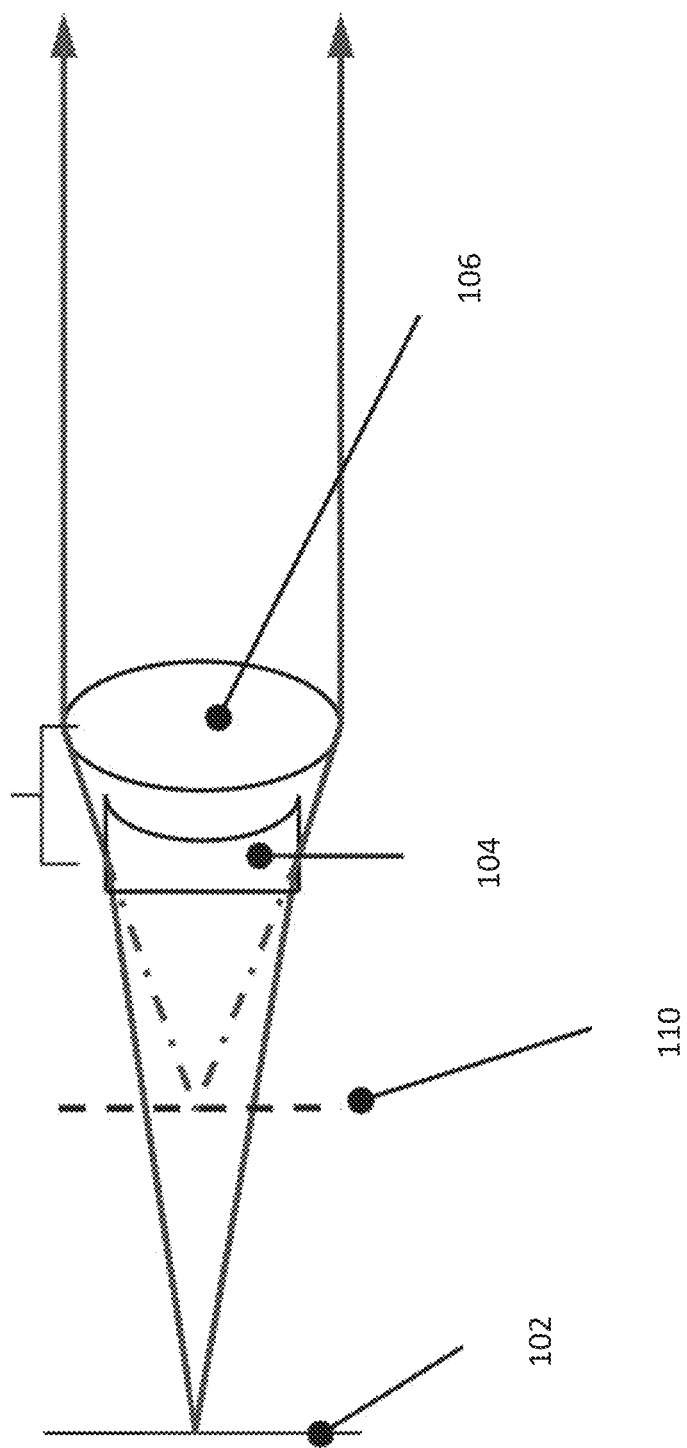
FIG. 4 is a schematic diagram of a near-eye display system, wherein the solid line style (-) represent light rays; dashed and dotted lines (- ■ - ■) represent the apparent path of light rays; and dashed-only lines (- -) represent the virtual image.

In some examples, particular combinations of pitch and focal lengths of the first and second lens arrays 104/106 may be selected such that the superlens can behave as a singlet lens producing a magnified image. An illustration of a portion of an example of a near-eye display system 100 is shown in FIG. 4. The display 102 is at the focal plane of the first lens array 104. Outgoing rays from the display 102 diverge as they pass through the first lens array 104, generating a virtual image 110 on the same side of the first lens array 104 as the display 102, and are collimated as they pass through the second lens array 106. In this example, the focal plane of the second lens array 106 is at the plane of the virtual image 110 generated by the first lens array 104.

Figure 5A:
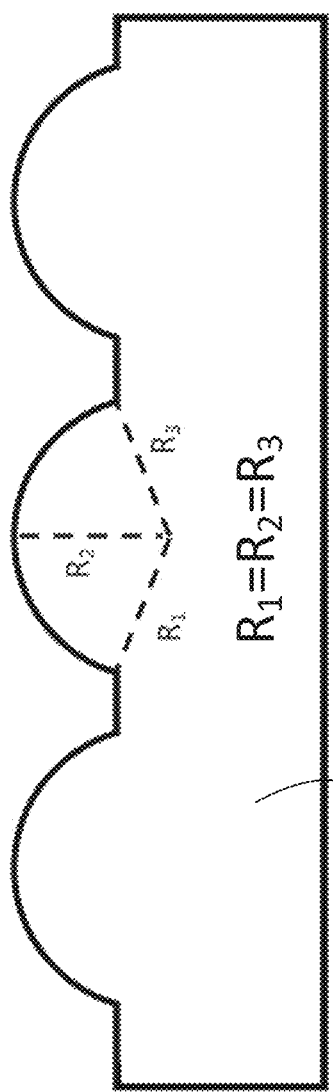
FIG. 5A is a schematic diagram of a spherical microlens surface.
Figure 5B:
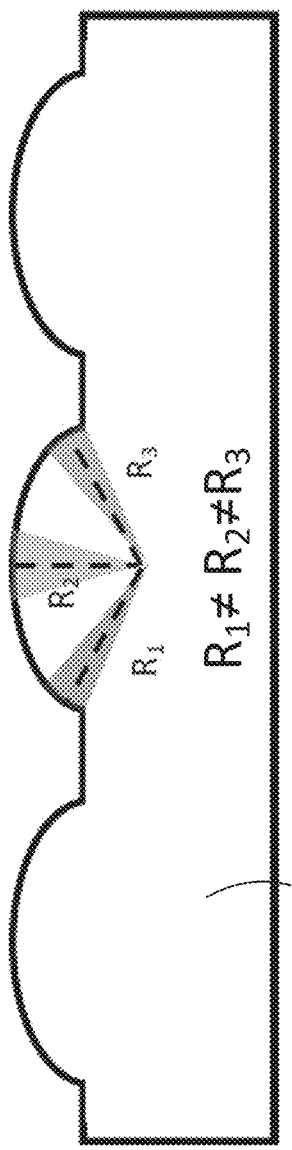
FIG. 5B is a schematic diagram of an aspherical micolens surface.

In some embodiments, each microlens of each of the first and second lens arrays 104/106 is a spherical microlens. In the context of the present disclosure, it should be understood that a microlens is spherical when the microlens surface, at all points, is equidistant from the center of the microlens, as shown in FIG. 5A (e.g., the microlens has a constant radius of curvature. In other embodiments, the microlenses may be aspherical. In the context of the present disclosure, it should be understood that a microlens is a spherical when the points of the microlens surface are not equidistant from the center of the microlens, as shown in FIG. 5B (e.g., the microlens does not have a constant radius of curvature). Aspherical microlenses may be used for optical aberration correction. Examples of optical aberrations include chromatic aberrations, distortion aberrations, coma aberrations and spherical aberrations.

Chromatic aberrations can occur, for example, when color displays (such as an LCD monitor) are viewed through a typical magnifying glass, and color separation might be observed. This is because the refractive power of the magnifying glass is different for different colors (wavelengths). Usually chromatic aberrations are minimized with the use of low refractive index materials, or the surface of a lens can be treated with diffractive gratings optimized for wavelengths of light of interest. Also, concave-convex lens pairs can be used such that they cancel out the chromatic aberration. The concave and convex arrays 104 and 104 of system 100 can be designed to minimize chromatic aberration.

Distortion aberrations can occur, for example, in typical spherical magnifiers, where the image viewed through the spherical magnifier can seem to be either pulled towards the viewer or away from the viewer at the edges of the image. This is because the magnification differs as we move from the center of the lens to the edge of the lens. This can be corrected by making the lens surface aspherical.

Other aberrations such as coma and spherical aberrations can also occur with spherical lenses, since the effective resolution of the lens will be far less than ideal because the light refracted by a spherical lens do not actually get focused at a common point on the optical axis. Instead, the focal point would be spread over a certain range on the optical axis, and the lens will never be in a perfect focus, which could decrease the resolution. This can also be corrected by having an aspherical lens surface. In practice, all non-ideal lenses cause optical aberrations to occur to a certain degree, and can be challenging to correct for all of the aberrations at the same time. Prior art solutions typically address aberrations through the use of additional lenses. In contrast, system 100 comprises only two arrays 104 and 106 of microlenses, and surface treatments may be used to correct for aberrations, such as for example, using diffractive gratings or modifying the lens surface geometry from spherical to aspherical. Whether or not particular aspherical microlenses and/or surface treatments are desirable for a particular NED system depends on what type of optical aberrations are required to be corrected. In some embodiments, a NED system design may begin with spherical microlenses in the arrays, then, based on other elements of the system (e.g., whether it is a folded or non-folded type system), adjust one or both of the lens arrays to include aspherical microlenses, diffractive gratings, or other surface treatments to address any optical aberrations.

In some embodiments, instead of each microlens of each being implemented a small simple lens, one or both of the first and second lens arrays 104/106 may be implemented as an array of diffractive grating microlenses or an array of Fresnel microlenses. A diffractive grating is an optical component with periodic structure, which splits and diffracts light into several beams traveling in different directions. The directions of these beams depend on the spacing of the grating and the wavelength of light.

FIG. 6A shows an example lens array 600A comprising a plurality of diffractive grating microlenses 602A. A diffractive grating microlens may be configured to act as a convex microlens or a concave microlens. In the example of FIG. 6A, the lens array 600A has binary phase gratings (i.e., only 1 grating step size), but other grating types may be used in other embodiments. Also, in some embodiments diffractive optics can also be used in conjunction with refractive optics, for example a refractive lens can be surface treated to have diffractive gratings on it.

FIG. 6B shows an example lens array 600B comprising a plurality of Fresnel microlenses 602B. Each Fresnel microlens comprises a plurality Fresnel grooves that have the same curvature as corresponding portions of a traditional continuous lens surface. In the example of FIG. 6B, the lens array 600B comprises convex Fresnel microlenses 602B, but concave Fresnel microlenses may be used to implement a concave lens array.

Some embodiments of a NED system according to the present disclosure comprise lens arrays with aspheric microlenses having diffractive gratings formed on the surfaces of the microlenses. Such a lens array may require more initial time or effort to construct (e.g. a more complex mold may be required), but once the initial lens array design is completed mass production of such arrays would be largely similar to arrays with spherical microlenses (e.g., by using the mold for stamping the arrays from suitable optical material).

In some embodiments, the near-eye display system may have a non-folded configuration, such as in the example schematically depicted in FIG. 1. In other examples, the near-eye display system may be in a folded configuration, as shown for example in FIGS. 7 and 8. In the context of the present disclosure, it should be understood that a non-folded optics configuration is an optical system in which the display surface and the surfaces of the lens arrays are parallel and share the same optical axis, which is normal to the surfaces. A folded optics configuration is an optical system in which the beam is bent for the purpose of reducing the physical length of the system or for the purpose of changing the path of the optical axis. Components such as free-form surface prisms, beam splitters, mirrors, waveguides and other optical components may be used to make a folded near-eye display system.

Figure 7:
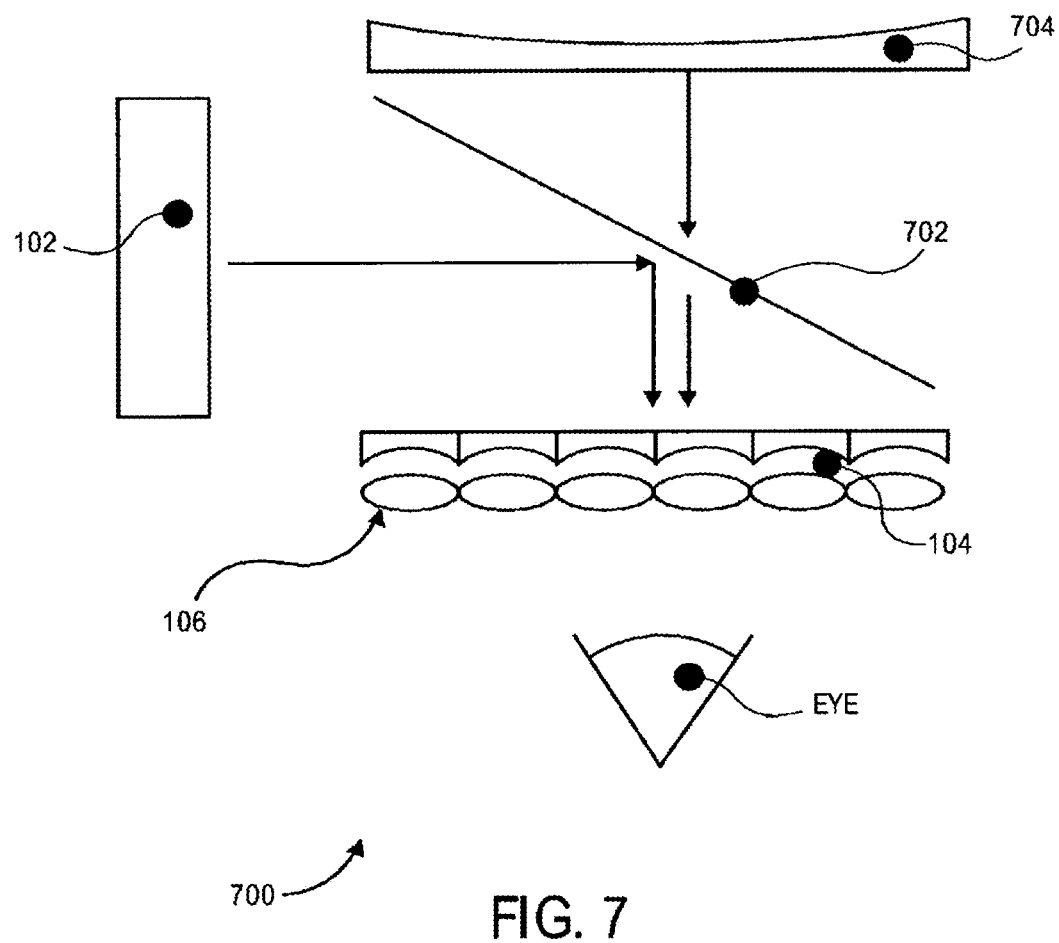
FIG. 7 is a schematic diagram of an example of a folded-eye display system.

FIG. 7 shows one example of a folded near-eye display system 700 where the lens arrays 104/106 are the final elements that light from the display passes through before reaching a user's eye. Briefly, the beam from the display 102 is redirected by a transparent beam redirection element 702 (e.g., a beam splitter, holographic optical element, or the like) before it travels to the lens arrays 104/106, then to a user's eye. A null lens 704 is used to negate the optical effect of the lens arrays 104/106, thus allowing the outside scenery to be seen through the transparent beam redirection element 702.

Figure 8:
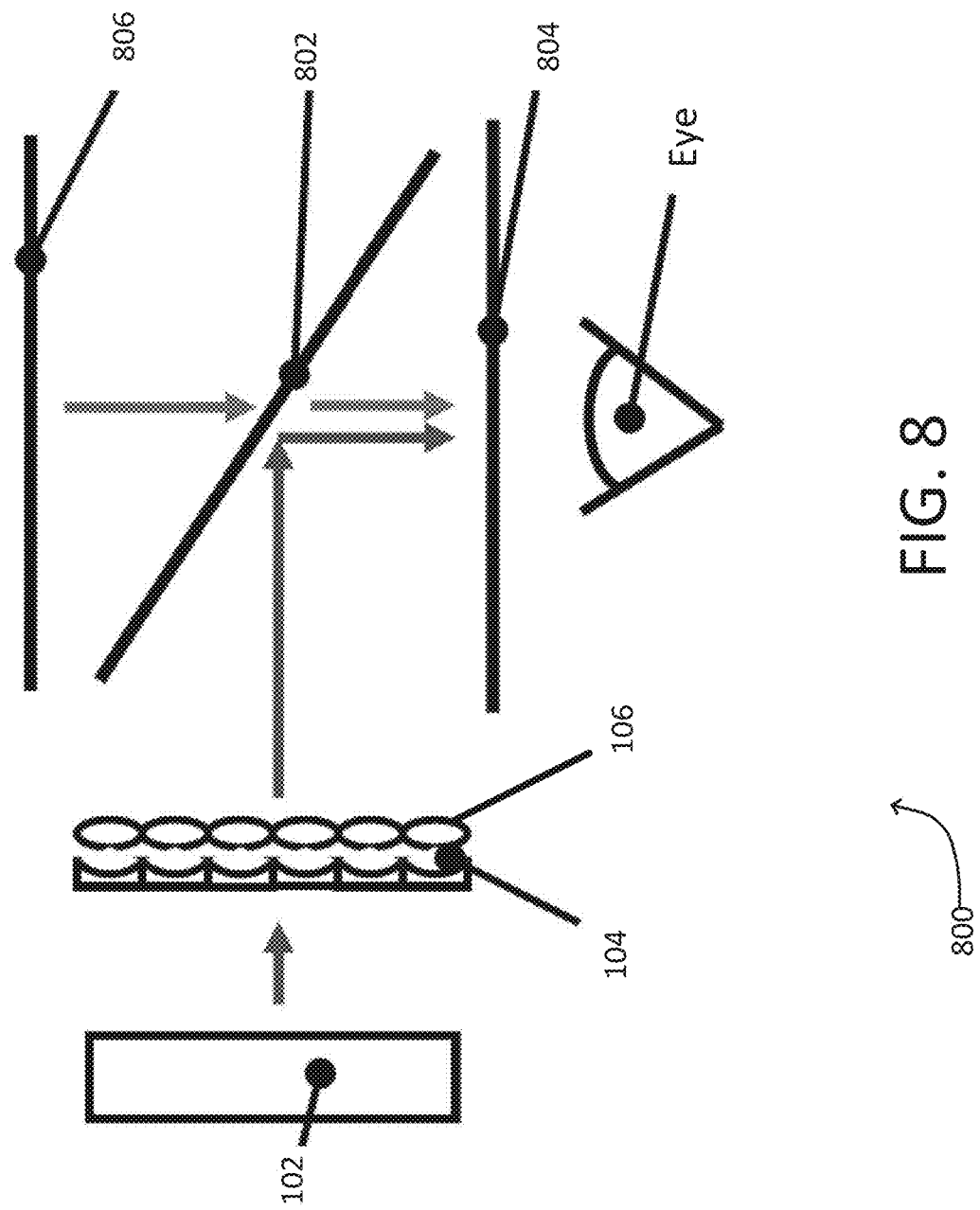
FIG. 8 is a schematic diagram of another example of a folded-eye display system.

FIG. 8 shows a second example of a folded near-eye display system 800 where the lens arrays 104/106 are the initial elements that light from the display passes through. Briefly, a beam from the display 102 travels to the lens arrays 104/106 before it is redirected by a transparent beam redirection element 802, then to a user's eye. The transparent beam redirection element 802 may, for example, be embedded within a transparent optical medium between a rear surface 804 and a front surface 806.

Head-up display (HUD) systems were initially developed for military aviation, but are now used in commercial aircrafts, automobiles, computer gaming and wearable devices. HUD systems, for example, include head-mounted wearable display devices that have the capability of reflecting projected images as well as allowing the user to see through it. Ideally, wearable HUD systems should be as compact as possible so that the user is comfortable wearing the system. Consequently, the display of most contemporary wearable HUD systems are positioned as close to the eye as possible to minimize the overall form-factor. The distance of a display from the eye may be referred to as "eye relief" of the display. For example, a near-eye display system as disclosed herein may be used to permit smaller eye relieve than certain prior art HUD systems.

Figure 9:
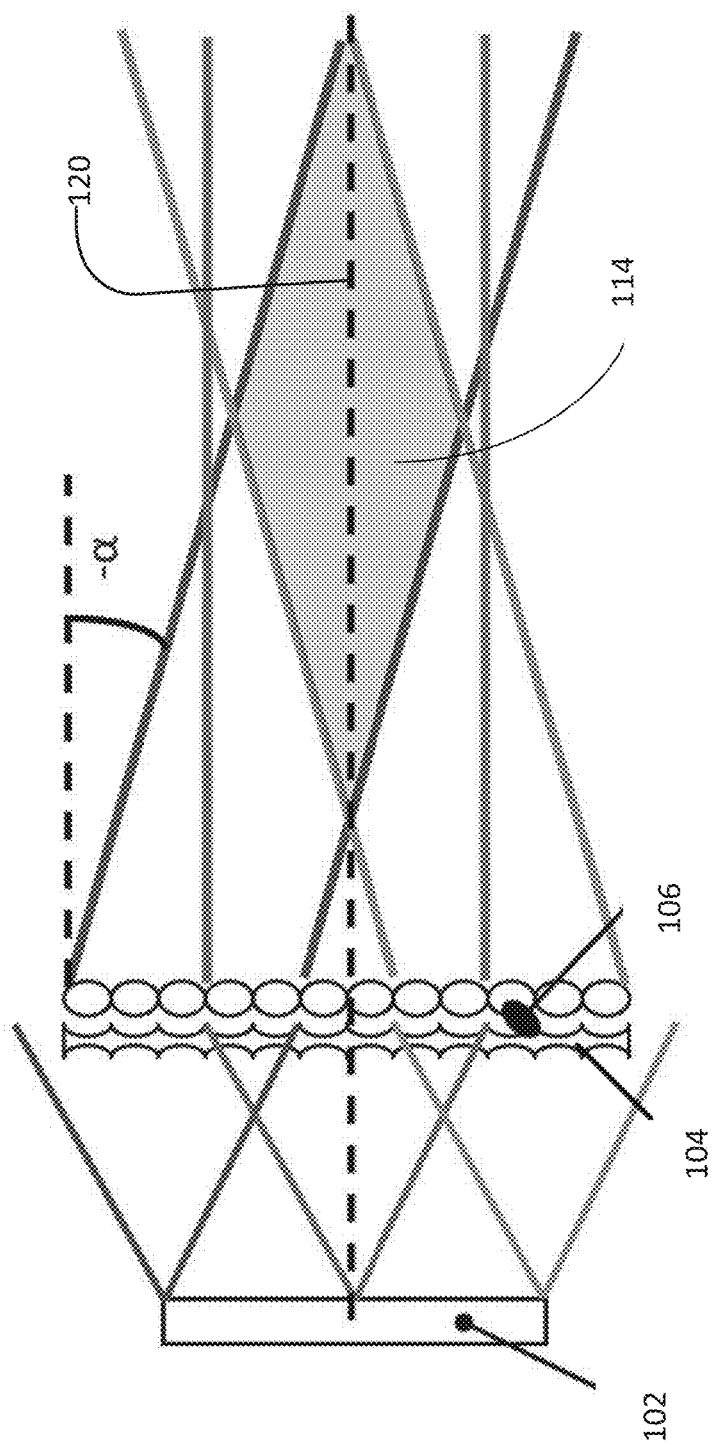
FIG. 9 is a schematic diagram of an eyebox (shaded region) formed in an example of a near-eye display system.

One consideration in the design of a HUD is the eyebox. The eyebox is the three-dimensional space in front of a near-eye display within which the complete virtual image of the display can be viewed by a user's eye. The larger the eyebox, the more freedom of head movement the viewer has while still being able to view the complete virtual image. An example of an eyebox 114 of a near-eye display system 100 according to certain embodiments of the present disclosure is shown in FIG. 9. The eyebox 114 is formed in the space created by overlapping collimated beams. The size of the eyebox is determined by the size of the display 102 and lens arrays 104/106, and the angle α, which may be referred to as the "exit angle." Angle α is defined as the angle between the optical axis 120 of the arrays 104/106, and light rays refracted from the outer edges (which may be referred to as "edge rays") of the second lens array 106. Angle α is considered to have a negative value when the edge rays converge, as shown in FIG. 9, which occurs in a concave-convex system such as system 100. In contrast, Angle α is considered to have a positive value in systems where the edge rays diverge.

Figure 10:
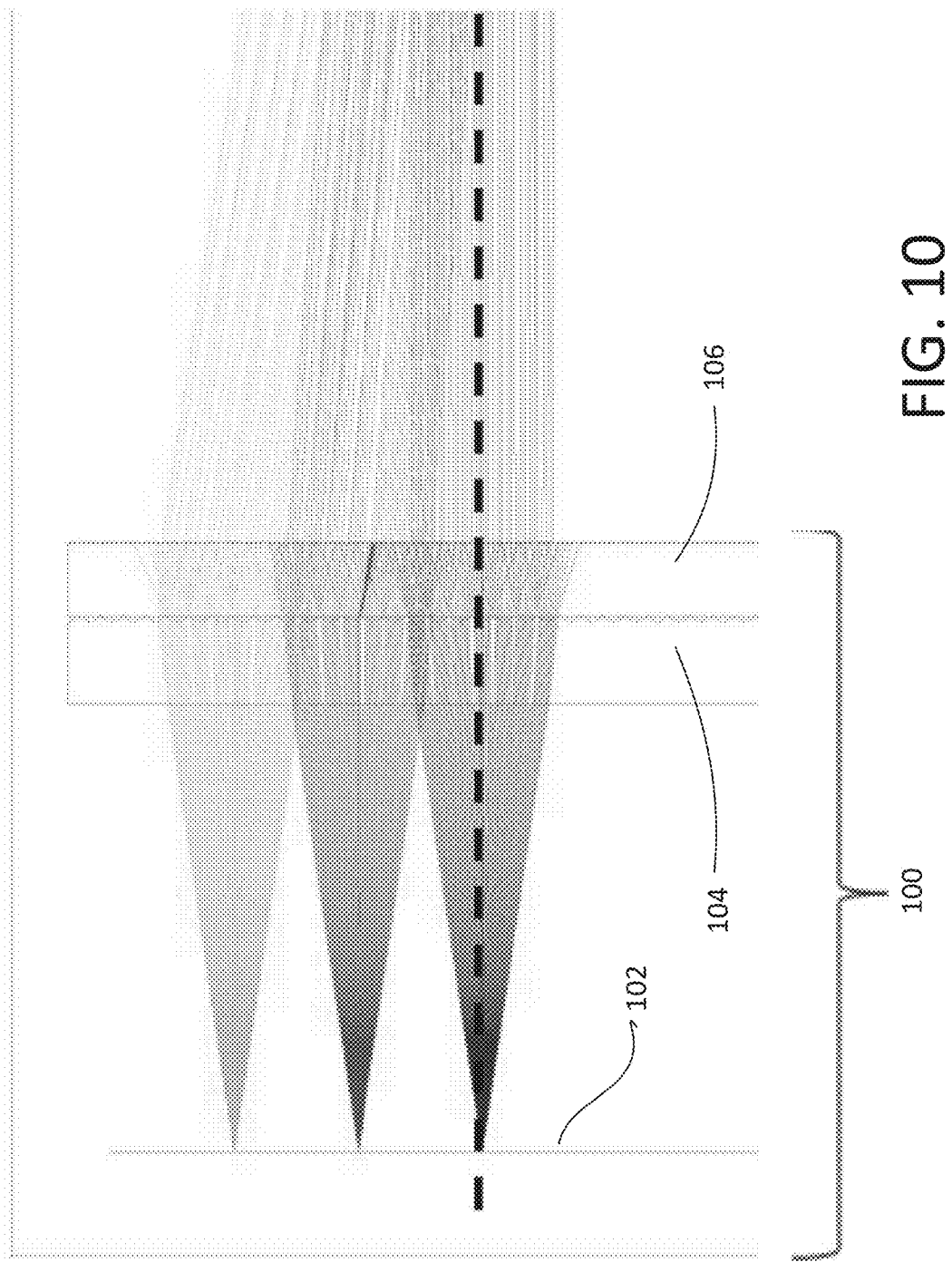
FIG. 10 is a schematic diagram of the results of a 2-D ray tracing simulation of an example of a near-eye display system.

In 2-D ray tracing simulations, the eyebox can be viewed as the area where collimated beams overlap, as shown in FIG. 10. The results of the simulation show the deflection of collimated beams, launched from different locations on the display 102, and deflected when exiting from the near-eye display system 100, which consists of the first and second lens arrays 104/106.

The field of view (FOV) of a near-eye display is a linear function of the size of the lens arrays. Consequently, in the examples herein, without any change in the lens array parameters (such as focal length or microlens diameter), a large FOV can be achieved by increasing the surface area of the lens arrays 104/106. An F-number is the ratio between the focal length and the aperture diameter of a lens. In some examples, the present disclosure provides a near-eye display system with an F-number of less than 1. For example, some embodiments provide a NED system with lens arrays 104/106 having a combined focal length of about 5.4 mm and an aperture diameter of about 12 mm, which translates to an F-number of about 0.45.

In some embodiments, the distance between the first lens array 104 and the second lens array 106 may be about 10 mm or less. For example, in some embodiments the first and second lens arrays 104/106 may be in contact with each other. In some embodiments, the distance between the first lens array 104 and the display 102 may be between about 0 mm and about 50 mm.

In some embodiments, the combined overall focal length of the first and second lens arrays 104/106 may be about 5 mm, the exit angle of the first and second lens arrays 104/106 may be about −14 degrees. In some embodiments, the first lens array 104 may have a pitch of about 260 μm, and the second lens array 106 may have a pitch of about 250 μm. In some embodiments, the first lens array 104 may have a pitch of about 280 μm, and the second lens array 106 may have a pitch of about 269 μm. As long as the ratio between pitches and the respective focal lengths of the first and second lens arrays 104/106 are kept constant, any pitches will work for given overall system focal length and exit angle. In some examples, the first lens array may have a focal length of about −400 μm and the second lens array may have a focal length of about 1020 μm.

Figure 11:
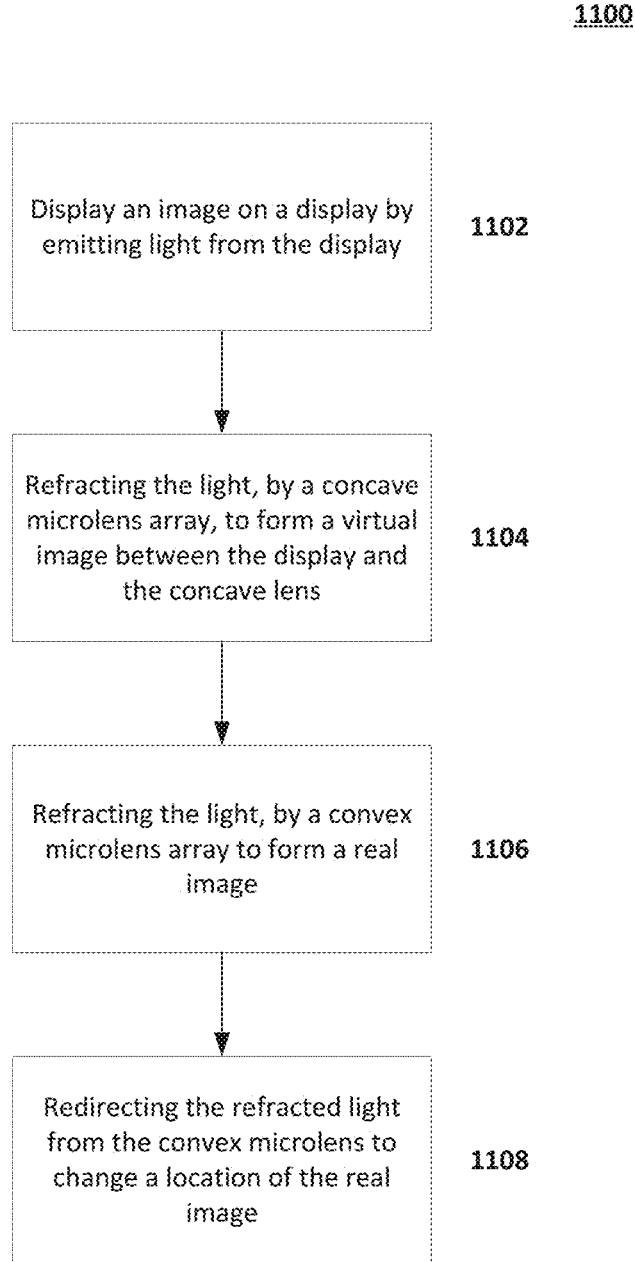
FIG. 11 is a process flow diagram for creating a virtual and real image from a display for a near-eye display device.

FIG. 11 is a process flow diagram 1100 for generating a virtual image. A display can emit light representing a displayed image (1102). A first, concave microlens array can receive the emitted light and refract the light, which can create a virtual image between the display and the first, concave microlens (1104). A second, convex microlens array can receive the refracted light, and refract the light to create real image of the emitted light representing the displayed image (1106). In some embodiments, the refracted light from the second, convex microlens array can be redirected to change the location of the resulting real image. In some embodiments, the displayed image can be redirected before reaching the first, concave microlens array.

Aspects of the embodiments are directed to a near-eye display system for generating a virtual image of a display. The near-eye display system may include a display, a first lens array comprising a plurality of concave microlenses having a first pitch; and a second lens array positioned in front of the first lens array, the second lens array comprising a plurality of convex microlenses having a second pitch. The first lens array can be positioned on an optical path between the display and the second lens array. The first lens array has a focal plane at the display and the second lens array has a focal plane at a virtual image plane of the first lens array.

Aspects of the embodiments are directed to a method for generating a virtual image. The method can include receiving, at a first, concave microlens array, light emitted from a display, generating a virtual image based on the light emitted from the display at a location between the display and the first, concave microlens array, receiving, at a second, convex microlens array, the light transmitted from the first, concave microlens array, and generating a real image based on the light emitted from the display with the second, convex microlens array.

Aspects of the embodiments are directed to a wearable apparatus configured to perform the method steps. Aspects of the embodiments are directed to a near-eye display device that includes a display means, a means for generating a real image, and a means for generating a virtual image. In some embodiments, the near-eye display device also includes means for changing the direction of emitted light.

In some implementations of the embodiments, the pitch of the first lens array is not equal to the pitch of the second lens array, such that the virtual image is magnified.

In some implementations of the embodiments, virtual image is magnified in comparison to the display by a magnification factor of at least 1.

In some implementations of the embodiments, the distance between the first lens array and the second lens array is between about 0 mm and about 10 mm.

In some implementations of the embodiments, the distance between the first lens array and the display is between about 0 mm and about 50 mm.

In some implementations of the embodiments, the distance between the first lens array and the second lens array is between about 0 mm and about 10 mm, and the distance between the first lens array and the display is between about 0 mm to about 50 mm.

In some implementations of the embodiments, wherein the first lens array has a pitch of about 260 µm.

In some implementations of the embodiments, wherein the second lens array has a pitch of about 250 µm.

In some implementations of the embodiments, the first lens array has a pitch of about 260 µm and the second lens array has a pitch of about 250 µm.

In some implementations of the embodiments, the first lens array has a focal length of about −400 µm.

In some implementations of the embodiments, the second lens array has a focal length of about 1020 µm.

In some implementations of the embodiments, the first lens array has a focal length of about −400 µm and the second lens array has a focal length of about 1020 µm.

In some implementations of the embodiments, the first and second lens arrays have an exit angle of about −14 degrees.

In some implementations of the embodiments, the first and second lens arrays have a ratio of combined focal length to aperture diameter of less than 1.

In some implementations of the embodiments, the first and second lens arrays have a ratio of combined focal length to aperture diameter of about 0.5.

In some implementations of the embodiments, the display, the first lens array and the second lens array have the same optical axis.

Some implementations of the near-eye display system may include a transparent beam redirection element; and a null lens. The display may be positioned substantially perpendicular to the first and second lens arrays. The transparent beam redirection element may be positioned on the optical path between the display and the first lens array, and the first and second lens arrays may be positioned between transparent beam redirection element and a user's eye. The null lens may be positioned on the opposite side the transparent beam redirection element from the first and second lens arrays and the null lens may be configured to negate the optical effect of the first and lens arrays.

Some implementations of the near-eye display system may include a transparent beam redirection element embedded within a transparent optical medium. The transparent beam redirection element may be positioned on the optical path between the second lens array and a user's eye.

In some implementations of the embodiments, the microlenses are spherical lenses.

In some implementations of the embodiments, the microlenses are aspherical lenses.

In some implementations of the embodiments, the near-eye display system includes diffractive gratings formed on the surfaces of the microlenses.

In some implementations of the embodiments, the near-eye display system includes diffractive gratings formed on the surfaces of the microlenses.

In some implementations of the embodiments, one of the first and second lens arrays comprises diffractive grating microlenses.

In some implementations of the embodiments, one of the first and second lens arrays comprises Fresnel microlenses.

In some implementations of the embodiments, the microlenses of the first lens array are biconcave.

In some implementations of the embodiments, the microlenses of the second lens array are biconvex.

In some implementations of the embodiments, the microlenses of the first lens array are biconcave and the microlenses of the second lens array are biconvex.

In some implementations of the embodiments, the microlenses of the first and second lens arrays are square lenses or hexagonal lenses arranged to provide a fill factor of substantially 100%.

In some implementations of the embodiments, the microlenses of the first and second lens arrays are circular lenses arranged in an orthogonal arrangement.

In some implementations of the embodiments, the microlenses of the first and second lens arrays are circular lenses arranged in a hexagonal arrangement.

In some implementations of the embodiments, a non-lens area of one of the first and second lens arrays comprises an opaque material.

In some implementations of the embodiments, a non-lens area of one of the first and second lens arrays comprises an opaque material.

The present disclosure may be embodied in other specific forms without departing from its spirit or essential characteristics. The described embodiments are to be considered in all respects only as illustrative and not restrictive.

The invention claimed is:

1. A near-eye display (NED) system for collimating light into a user's eye while substantially maintaining the user's field of view (FOV), the system comprising:
   a display;
   a first microlens array comprising a plurality of microlenses having a first pitch; and,
   a second microlens array positioned in front of the first microlens array, the second microlens array comprising a plurality of microlenses having a second pitch and configured to sit proximally to the user's eye;
   wherein, the first microlens array is disposed in an optical path between the display and the second microlens lens array;
   further wherein the first microlens array has a focal plane at the display and the second microlens array has a focal plane at a virtual image plane of the first microlens array.

2. The near-eye display system of claim 1, wherein the pitch of the first microlens array is not equal to the pitch of the second microlens array, such that the virtual image is magnified.

3. The near-eye display system of claim 1, wherein the display, the first microlens array and the second microlens array have the same optical axis.

4. The near-eye display system of claim 1, wherein one of the first or second microlens arrays comprises diffractive grating microlenses.

5. The near-eye display system of claim 1, wherein one of the first or second microlens arrays comprises Fresnel microlenses.

6. The near-eye display system of claim 1, wherein the microlenses of the first microlens array are biconcave.

7. The near-eye display system of claim 1, wherein the microlenses of the second microlens array are biconvex.

8. The near-eye display system of claim 1, wherein the microlenses of the first and second microlens arrays are circular microlenses arranged in an orthogonal arrangement.

9. The near-eye display system of claim 1, wherein the microlenses of the first and second microlens arrays are circular microlenses arranged in a hexagonal arrangement.

10. The near-eye display system of claim 1, wherein a non-microlens area of one of the first or second microlens arrays comprises an opaque material.

11. The near-eye display system of claim 1, wherein the pitch of the first microlens array is not equal to the pitch of the second microlens array, such that the virtual image is collimated.

12. The near-eye display system of claim 11, wherein the system has a focal length between 5 mm and 9 mm.

13. The near-eye display system of claim 1, wherein arrangement of the first and second microlens arrays are one of: one convex microlens array and one concave microlens array; two concave microlens arrays; and, two convex microlens arrays.

14. The near-eye display system of claim 13, wherein thickness of the first and second microlens arrays are between 2 mm and 4 mm.

15. A wearable apparatus for magnifying light into a user's eye while substantially maintaining the user's field of view (FOV), the apparatus comprising:
a first microlens array comprising a plurality of microlenses having a first pitch; and,
a second microlens array disposed between the first microlens array and the user's eye, the second microlens array comprising a plurality of microlenses having a second pitch and configured to be disposed less than a distance from the user's eye, the distance being less than 10 cm;
wherein, the apparatus is configured to generate a virtual image further away from the distance to eye so that the image can be comfortably viewed.

16. The wearable apparatus of claim 15, wherein the pitch of the first microlens array is not equal to the pitch of the second microlens array, such that the virtual image is magnified.

17. The wearable apparatus of claim 15, wherein the display, the first microlens array and the second microlens array have the same optical axis.

18. The wearable apparatus of claim 15, wherein one of the first or second microlens arrays comprises diffractive grating microlenses.

19. The wearable apparatus of claim 15, wherein one of the first or second microlens arrays comprises Fresnel microlenses.

20. The wearable apparatus of claim 15, wherein the microlenses of the first microlens array are biconcave.

21. The wearable apparatus of claim 15, wherein the microlenses of the second microlens array are biconvex.

22. The wearable apparatus of claim 16, wherein the wearable apparatus has a focal length between 5 mm and 9 mm.

23. The wearable apparatus of claim 15, wherein the arrangement of the first and second microlens arrays are one of: one convex microlens array and one concave microlens array; two concave microlens arrays; and, two convex microlens arrays.

24. The wearable apparatus of claim 23, wherein thickness of the first and second microlens arrays are between 2 mm and 4 mm.

25. The wearable apparatus of claim 15, further comprising a display and a beamsplitter, the beamsplitter disposed in an optical path between the display and second microlens array and configured to reflect an image from the display to the first microlens array, at least in part.

26. A wearable near eye display (NED) for generating a virtual image further away from a user's eye so that the image can be comfortably viewed by the user, the NED comprising:
a first microlens array comprising a plurality of microlenses having a first pitch;
a second microlens array positioned in front of the first lens array, the second microlens array comprising a plurality of microlenses having a second pitch;
a transparent beam redirection element; and,
a display;
wherein the display is positioned generally perpendicular to the first and second microlens arrays;
wherein the first microlens array is positioned on an optical path between the display and the second microlens array; and,
further wherein, the transparent beam redirection element is positioned on the optical path between the display and the first microlens array and the first and second microlens arrays are positioned between transparent beam redirection element and the user's eye.

27. The wearable apparatus of claim 26, wherein the transparent beam redirection element is embedded within a transparent optical medium, wherein the transparent beam redirection element is positioned on the optical path between the second microlens array and the user's eye.

28. The wearable apparatus of claim 26, further comprising a null lens which is positioned on the opposite side the transparent beam redirection element from the first and second microlens arrays and the null lens is configured to negate the optical effect of the first and microlens arrays.

* * * * *